US012377978B2

(12) United States Patent
Ghio (10) Patent No.: US 12,377,978 B2
(45) Date of Patent: Aug. 5, 2025

(54) DRONE FLEET MANAGEMENT SYSTEM (71) Applicant: INSPIRE S.R.L., Genoa (IT)

(72) Inventor: Marco Ghio, Genoa (IT)

(73) Assignee: INSPIRE S.R.L., Genoa (IT)

( * ) Notice: Subject to any disclaimer, the term of this patent is extended or adjusted under 35 U.S.C. 154(b) by 0 days.

(21) Appl. No.: 18/253,832

(22) PCT Filed: Nov. 24, 2021

(86) PCT No.: PCT/IB2021/060922
§ 371 (c)(1),
(2) Date: May 22, 2023

(87) PCT Pub. No.: WO2022/112964
PCT Pub. Date: Jun. 2, 2022

(65) Prior Publication Data
US 2023/0406501 A1    Dec. 21, 2023

(30) Foreign Application Priority Data
Nov. 26, 2020   (IT) .................. 102020000028631

(51) Int. Cl.
*B64U 70/93*      (2023.01)
*A62C 3/02*       (2006.01)
(Continued)

(52) U.S. Cl.
CPC .............. *B64D 1/16* (2013.01); *A62C 3/0235* (2013.01); *B64U 70/93* (2023.01); *B64U 80/20* (2023.01);
(Continued)

(58) Field of Classification Search
CPC .... B64U 80/20; B64U 80/25; B64U 2101/47; B64U 70/93; B64U 70/97
See application file for complete search history.

(56) References Cited

U.S. PATENT DOCUMENTS 10,377,491 B1   8/2019   Fine et al.
11,104,436 B2   8/2021   Ghio
(Continued)

FOREIGN PATENT DOCUMENTS

CN    107792368 A    3/2018
DE      8414540 U1   10/1984
(Continued)

OTHER PUBLICATIONS

International Search Report and Written Opinion for PCT/IB2021/060922 mailed May 28, Mar. 18, 2022.
(Continued)

*Primary Examiner* — Timothy D Collins
*Assistant Examiner* — Terri L Filosi
(74) *Attorney, Agent, or Firm* — Perilla Knox & Hildebrandt LLP; Kenneth A. Knox (57) ABSTRACT

Drone management system comprising at least one drone (1) and a logistic support unit (2) of said drone (1). Said drone (1) comprising at least one container (3) adapted to contain service material, which container (3) comprises at least one inlet mouth (34 35) of said service material and expulsion means (35) of said service material. Said logistic support unit (2) comprises a resupply area of said container (3), which resupply area comprises resupply means (43, 44, 45) of said container. Said resupply means comprise position locking means (45) of said container (3), dispensing means communicating with a tank and a dispensing mouth (43, 44) adapted to communicate with said inlet mouth (34, 35), said resupply area comprising a basin element (4), the walls (41) of which converge towards said resupply means.

10 Claims, 9 Drawing Sheets

(51) Int. Cl.
  *B64D 1/16* (2006.01)
  *B64U 80/20* (2023.01)
  *B64U 80/25* (2023.01)
  *B64U 80/86* (2023.01)
  *B64U 101/47* (2023.01)
  *B64U 50/11* (2023.01)

(52) U.S. Cl.
  CPC ............ *B64U 80/25* (2023.01); *B64U 80/86* (2023.01); *B64U 50/11* (2023.01); *B64U 2101/47* (2023.01)

(56) References Cited

U.S. PATENT DOCUMENTS

| | | | |
|---|---|---|---|
| 2003/0146005 A1 | 8/2003 | Brooke et al. | |
| 2016/0075422 A1 | 3/2016 | Goldstein | |
| 2016/0307448 A1* | 10/2016 | Salnikov | A01B 79/02 |
| 2018/0186454 A1* | 7/2018 | Luckay | B64F 1/32 |

FOREIGN PATENT DOCUMENTS

| | | |
|---|---|---|
| IT | MI20120593 A1 | 10/2013 |
| WO | 2012001614 A1 | 1/2012 |
| WO | 2017208272 A1 | 12/2017 |
| WO | 2018165057 A1 | 9/2018 |
| WO | 2019193617 A1 | 10/2019 |

OTHER PUBLICATIONS

Intention to Grant for EP Patent Application No. 21 835 825.7-1004 of Feb. 21, 2025.
Notification of Deficiencies for EP Patent Application No. 21 835 825.7-1004 of Jul. 7, 2023.
Examination Report for AU Patent Application No. 2021386924 of May 21, 2024.
Examination Report for AU Patent Application No. 2021386924 of May 13, 2025.
Notice of Acceptance for AU Patent Application No. 2021386924 of May 14, 2025.
Office Action for CA Patent Application No. 3200113 of Sep. 27, 2024.
Office Action for IL Patent Application No. 303017 of Mar. 17, 2024.

* cited by examiner

DRONE FLEET MANAGEMENT SYSTEM

CROSS-REFERENCE TO RELATED APPLICATIONS

This application is a national phase application under 35 U.S.C. § 371 of International Application No. PCT/IB2021/060922 filed Nov. 24, 2021, entitled, "DRONE FLEET MANAGEMENT SYSTEM," which claims the benefit of and priority to Italian Patent Application No. 102020000028631 filed Nov. 26, 2020, the contents of each of which being incorporated by reference in their entireties herein.

BACKGROUND

"Precision landing" is the landing procedure of a specific drone which, by virtue of the use of one or more dedicated technologies, is able to ensure a predetermined landing point with a margin of error which is compatible with the requirements, regardless of any other factors (wind, rain, etc.). This covers a crucial aspect of drone or drone fleet management and, in the art, it is a very complex procedure to be ensured especially in various use scenarios.

In fact, a landing error greater than a range considered acceptable with respect to the desired point not only causes a possible breakage of the drone due to undesired impacts, but also possible malfunctions of the service platforms, with the risk of obtaining temporary periods of inactivity of the platforms themselves which, being unable to perform the expected services, would create serious problems to other drones in flight waiting for resupply.

The resupply of the containers also requires long times, with the risk of creating "queues" of the resupply means, since the management of several drones at the same time is particularly complex.

BRIEF SUMMARY

The present disclosure relates to a drone management system comprising at least one drone and a drone logistic support unit.

The drone comprises at least one container adapted to contain service material, which comprises at least one service material inlet mouth and expulsion means of said material.

Furthermore, the logistic support unit includes a container resupply area, which resupply area comprises means for resupplying said container.

What was just described is the common configuration of systems for managing drones, or in particular drone fleets, and which are commonly used for monitoring activities, surveillance and missions aimed at extinguishing fires.

The present disclosure optionally, but not exclusively, relates to drone fleet management systems for firefighting activities, an example of which is illustrated in patent application WO2017/208272, the contents of which are to be considered a part of the present disclosure.

From the following description, it will be apparent that the present disclosure is not limited to firefighting operations, but can optionally be used in all activities involving the expulsion of material from a raised position, such as operations aimed at sowing fields or the like.

The system object of the present disclosure can for example also be used in material transport operations, from one point to another, in which it is necessary to envisage multiple journeys by the drones and a resupply step of the material to be transported.

The drones used in such systems comprise a container adapted to contain a service material, such as an extinguishing liquid or powder, which is discharged onto the flames, so as to subdue them and prevent the fire from flaring.

Therefore, the missions of the drones in firefighting operations are completely similar to those carried out by aircraft such as helicopters, canadair, or the like which envisage filling a container with water, pouring such water over the flames, filling the container and so on, until the fire is extinguished.

It is evident that such an activity requires several trips in order to subdue the flames, especially in the case of drones, which can carry small containers with respect to helicopters or canadair.

For this reason, fleets of drones are used, so that the systems known in the state of the art can perform numerous actions of dispensing the extinguishing material and in several points at the same time.

Therefore, the use of drone fleets has numerous advantages, however the drones must be recharged often, both from an energy point of view, for example to recharge the batteries, and from a service material point of view, due to the small/medium size of the containers which are often small/medium in size.

In particular, the resupply of drone containers, as described in patent application WO2017/208272, is a particularly delicate activity, as it requires landing the drone at a precise point, with a correct orientation, in order to replace and/or fill the container of each drone.

"Precision landing" is the landing procedure of a specific drone which, by virtue of the use of one or more dedicated technologies, is able to ensure a predetermined landing point with a margin of error which is compatible with the requirements, regardless of any other factors (wind, rain, etc.). This covers a crucial aspect of drone or drone fleet management and, in the state of the art, it is a very complex procedure to be ensured especially in various use scenarios.

In fact, a landing error greater than a range considered acceptable with respect to the desired point not only causes a possible breakage of the drone due to undesired impacts, but also possible malfunctions of the service platforms, with the risk of obtaining temporary periods of inactivity of the platforms themselves which, being unable to perform the expected services, would create serious problems to other drones in flight waiting for resupply.

The resupply of the containers also requires long times, with the risk of creating "queues" of the resupply means, since the management of several drones at the same time is particularly complex.

There is therefore a need, not satisfied by the systems known in the state of the art, to obtain a drone management system which allows to obtain an efficient resupply of at least the service material transported by the drones themselves, without requiring long times and in a completely automated manner, ensuring a precise positioning of the container, optimal to allow the resupply thereof.

The present disclosure achieves the foregoing objectives by making a system as described above, in which the resupply means comprise means for locking the container in position, dispensing means communicating with a tank and a dispensing mouth adapted to communicate with the inlet mouth.

Furthermore, the resupply area comprises a basin element, the walls of which converge towards the resupply means.

The system thus obtained allows to obtain a precise positioning of the container at the resupply means, so that a rapid dispensing of the service material allows a fast resupply which does not create a hindrance for the subsequent resupply of the other drones and therefore does not require the landing of the drone to allow the resupply steps.

The expected positioning of the container is obtained by virtue of the presence of the basin element, without the need to include complex systems aimed at estimating the correct position of the drone and the correct position of the resupply means.

Optionally, the drones used in the system object of the present disclosure do not land on the logistic support unit, but simply place the container on the logistic support unit, in order to allow the resupply thereof.

As in the systems known in the state of the art, it is possible to identify a collection area, i.e., an area at the logistic support unit in which the drone rests the container.

The presence of the element allows such a collection area to be enlarged, by virtue of the flaring of the walls of the basin element.

Such a configuration also has a further advantage in that, once the drone is in the process of resting the container, it does not require any intervention by auxiliary means adapted to move the drone, such as the gripping bars which are commonly used in the systems known in the state of the art.

All the drones at the basin element, by virtue of the interaction between the container and the basin element, will therefore be conveyed naturally, by virtue of the force of gravity, at the resupply means.

According to a possible embodiment, the drone(s) belonging to the system object of the present disclosure comprise means for detecting the distance of the drone(s) from the resupply area.

Thereby each drone will be able to estimate a position at the resupply area, in particular the basin element, evaluate the distance between the drone and the basin element, so as to start a vertical descent until the container comes into contact with the walls of the basin element and so that the container can subsequently begin to slide along such walls for the resupply.

Furthermore, according to an embodiment, the locking means comprise means for orienting the container.

Therefore, the correct positioning of the container is obtained not only at the filling means, but also with the inlet mouth of the container oriented towards the resupply means, so as to obtain a resupply as quickly as possible, facilitating the attachment of a possible dispensing mouth of the service material to the inlet mouth.

The presence of the basin element has even more advantageous aspects if the container is fixed to the drone through one or more connection cables.

Therefore, the container is not integral with the drone, but is free to oscillate during the flight of the drone, precisely by virtue of the deformability of the cables.

Therefore, the shape of the basin element helps the positioning of the container at the resupply means, an action which is particularly complex especially in the case of oscillating bodies or in any case provided with relative movement with respect to the tractor body of the drone.

Furthermore, by virtue of the presence of the distance detection means, the drone will not necessarily have to check that such cables are always taut, it will be sufficient to calculate the distance between the drone body and the container.

Advantageously, the container comprises means for electrical connection to the drone and/or to the logistic support unit.

The electrical connection allows to send container information, such as the fill state, to both the drone and the logistic support unit, and also allows the drone and the logistic support unit to send control signals to the container.

Since the containers used are elements optionally with a flat bottom, in order to facilitate the sliding of the container itself along the walls of the basin element, said element comprises sliding elements configured for the sliding of said container.

For example, it is possible to include a plurality of metal beads present on the surface of the basin element which easily allow the container to slide towards the centre of the basin element, rotating thereon in contact with the container surface.

Alternatively or in combination it is possible to include a plurality of rollers with a rotation axis perpendicular to the container sliding direction.

According to an embodiment, the drone comprises combustion propulsion means.

In this case, the container has at least a first compartment and at least a second compartment isolated from each other.

The first compartment is adapted to contain the service material and the second compartment is adapted to contain fuel for the propulsion means, the second compartment being in communication with the drone.

By virtue of such a configuration, the system object of the present disclosure includes drones which not only ensure the advantages of vehicles with combustion engines with respect to vehicles with electric motors (battery life, transportable weight, etc.), but also have specific advantages related to the applications of interest.

In fact, the lack of the battery greatly reduces the management times of each drone, which will simply have to be resupplied, without requiring battery replacement.

To further optimize such an aspect, optionally the dispensing means communicate with a first tank of service material and with a second fuel tank.

Furthermore, the dispensing means comprise a first dispensing mouth adapted to communicate with the first compartment and a second dispensing mouth adapted to communicate with the second compartment.

Therefore, during the resupply step it is possible to fill the container with both the service material and the fuel, optimizing the drone management times, with respect to the flight autonomy and enabling continuous operation over time without the need for fuel resupply stops.

Furthermore, such a configuration allows the drone to avoid landing, but simply to position the container in contact with the resupply means, fill the container and be ready for the next mission. This aspect is particularly advantageous since, avoiding the need to land in a precise point, it avoids having to necessarily meet the precision landing requirements of the drone in various application scenarios. On the contrary, the centring of the container by gravity inside the basin will allow the drone itself to detect such a translation and to automatically place itself vertically over the point indicated for resupply without the use of devices for "precision landing".

It is clear that the resupply means must fill the container as quickly as possible, so they must work at high pressure.

For this reason, the locking means must lock the container quickly and safely.

To achieve such a result, optionally, the locking means comprise means provided with electromagnets activatable on request adapted to engage with said container.

The electromagnetic means can be included precisely for locking the container in place, but also for locking the dispensers in the inlet mouths of the service material and fuel compartments.

Finally, given the advantages described above and related to the system object of the present disclosure, the present disclosure also relates to a remote-controlled aircraft of the drone type or the like.

Such a drone comprises combustion propulsion means and a container mounted below the drone body.

As with the system, also in this case the drone can include any propulsion means known in the state of the art, optionally, which requires any material as fuel.

In particular, the container is made according to one or more of the features described above.

BRIEF DESCRIPTION OF THE FIGURES

These and other features and advantages of the present disclosure will become clearer from the following description of some exemplary embodiments illustrated in the accompanying drawings in which.

DETAILED DESCRIPTION

It is specified that the figures attached to the present patent application show only some possible embodiments of the drone management system object of the present disclosure, to better understand its described advantages and features.

Such embodiments are therefore to be understood for purely illustrative and non-limiting purposes of the inventive concept of the present disclosure, i.e., to provide a drone management system which allows to obtain an efficient resupply of the containers transported by the drones themselves, without necessarily requiring the landing of the drones.

Figure 1A:
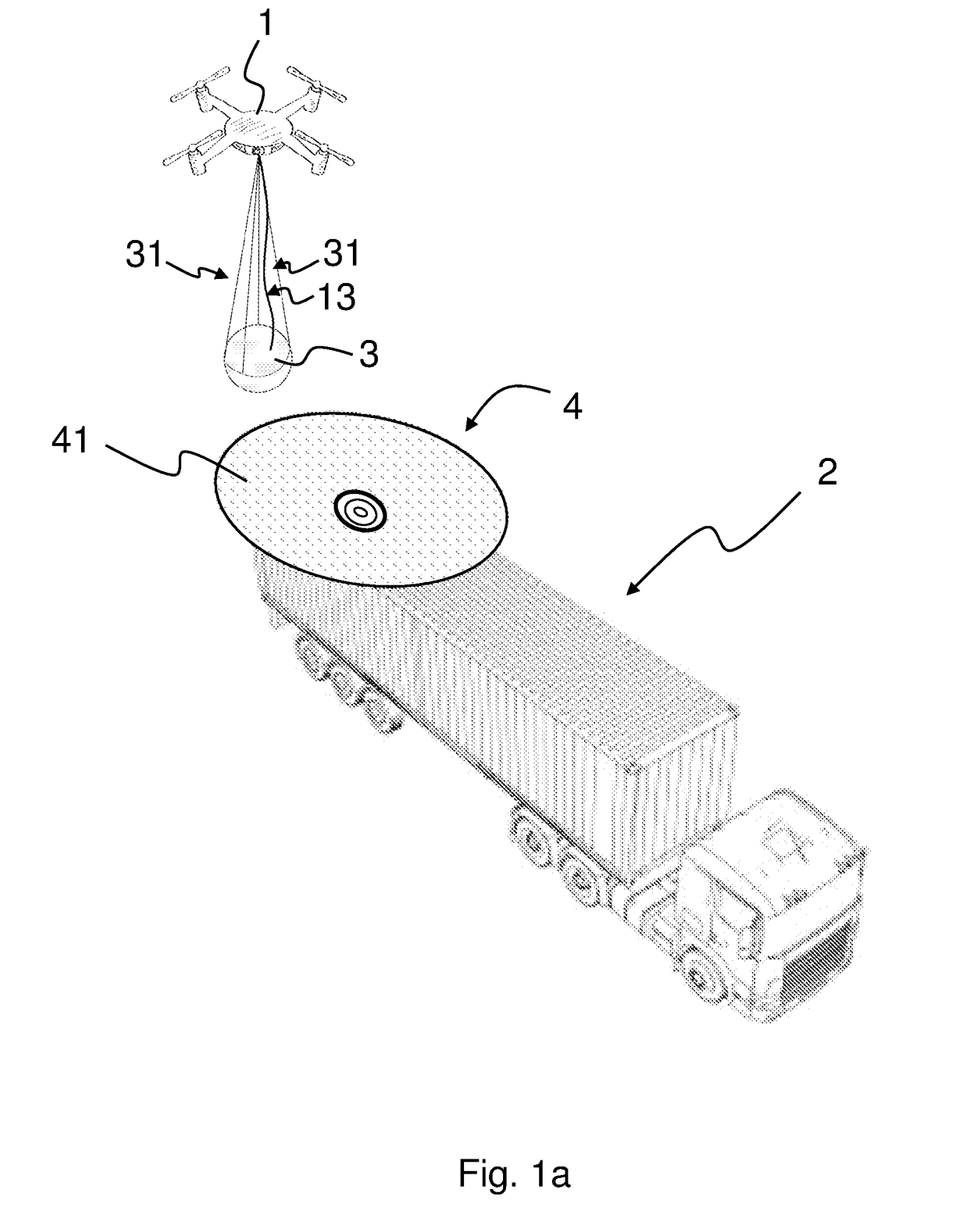
FIGS. 1a and 1b illustrate two views of a possible embodiment of the drone management system object of the present disclosure.
Figure 1B:
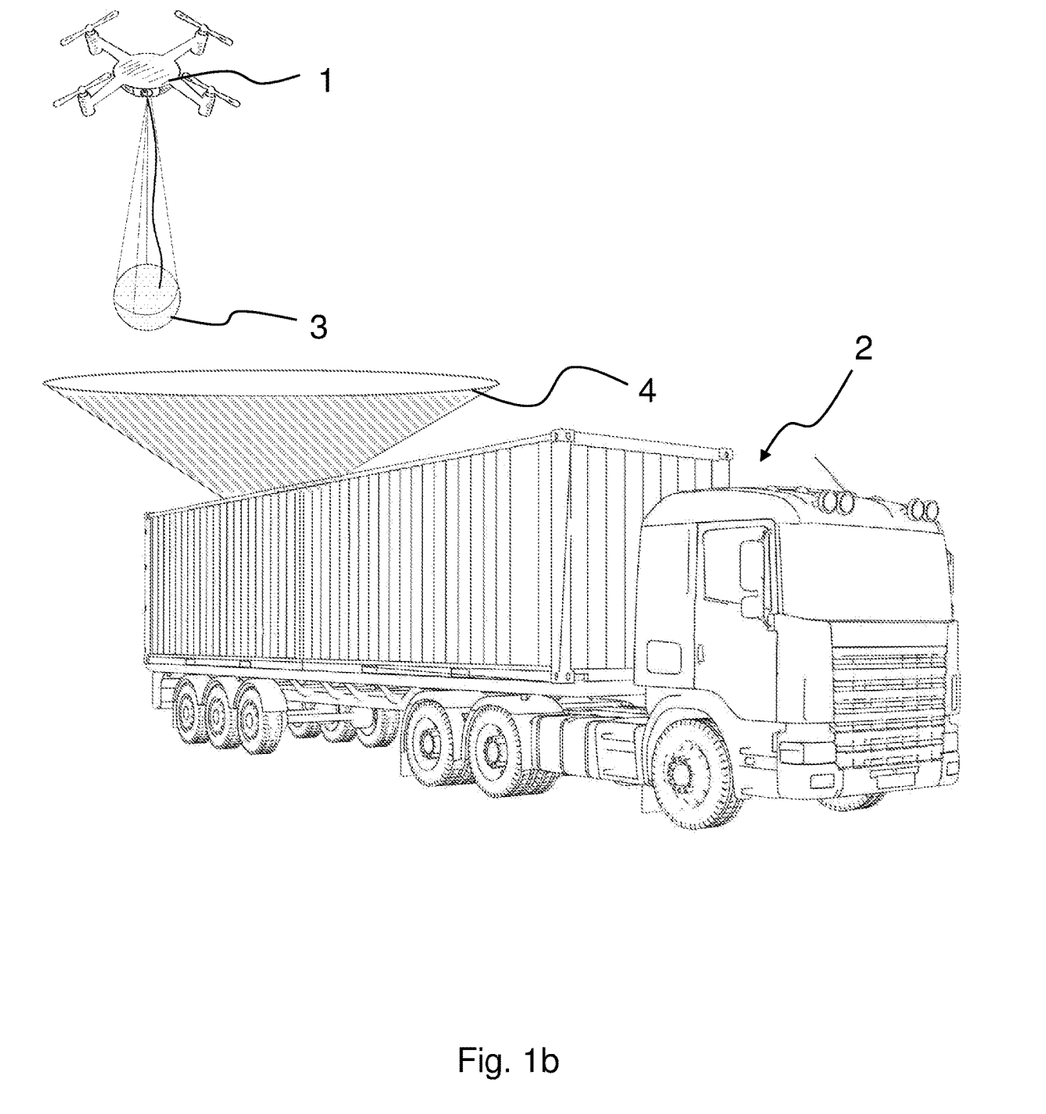

With particular reference to FIGS. 1a and 1b, two perspective views of a possible embodiment of the system object of the present disclosure are illustrated.

The system comprises at least one drone 1 and a logistic support unit 2 of said drone 1.

The logistic support unit 2 in this case is illustrated as a truck, which has a trailer container inside from which it is possible to transport one or more drones, tanks for the resupply of the material to be loaded on the drone containers as well as perform all the necessary maintenance to the drones.

The logistic support unit can also comprise a plurality of trucks, also aimed at providing different services.

Especially in firefighting operations, a logistic support unit which can be moved on wheels is advantageous, as it can transport drones close to the fire and then have them take off, so as to reduce the flight time.

In particular, the logistic support unit allows the resupply of the drones.

In fact, the drone 1 comprises at least one container 3 adapted to contain service material, such as a firefighting liquid.

The logistic support unit 2 comprises a resupply area which comprises resupply means of the container 3, in which the drone 1 positions said container 3 so that it can be filled with at least service material.

The resupply means comprise position locking means of the container 3, dispensing means communicating with a tank and a dispensing mouth adapted to communicate with the container 3.

Furthermore, according to the variant illustrated in the figures, the resupply area comprises a basin element 4, the walls of which converge towards said resupply means.

The drone 1 thus makes several trips, in which it resupplies the container 3, which, in addition to an inlet mouth of the service material, comprises expulsion means of said service material.

Figure 3:
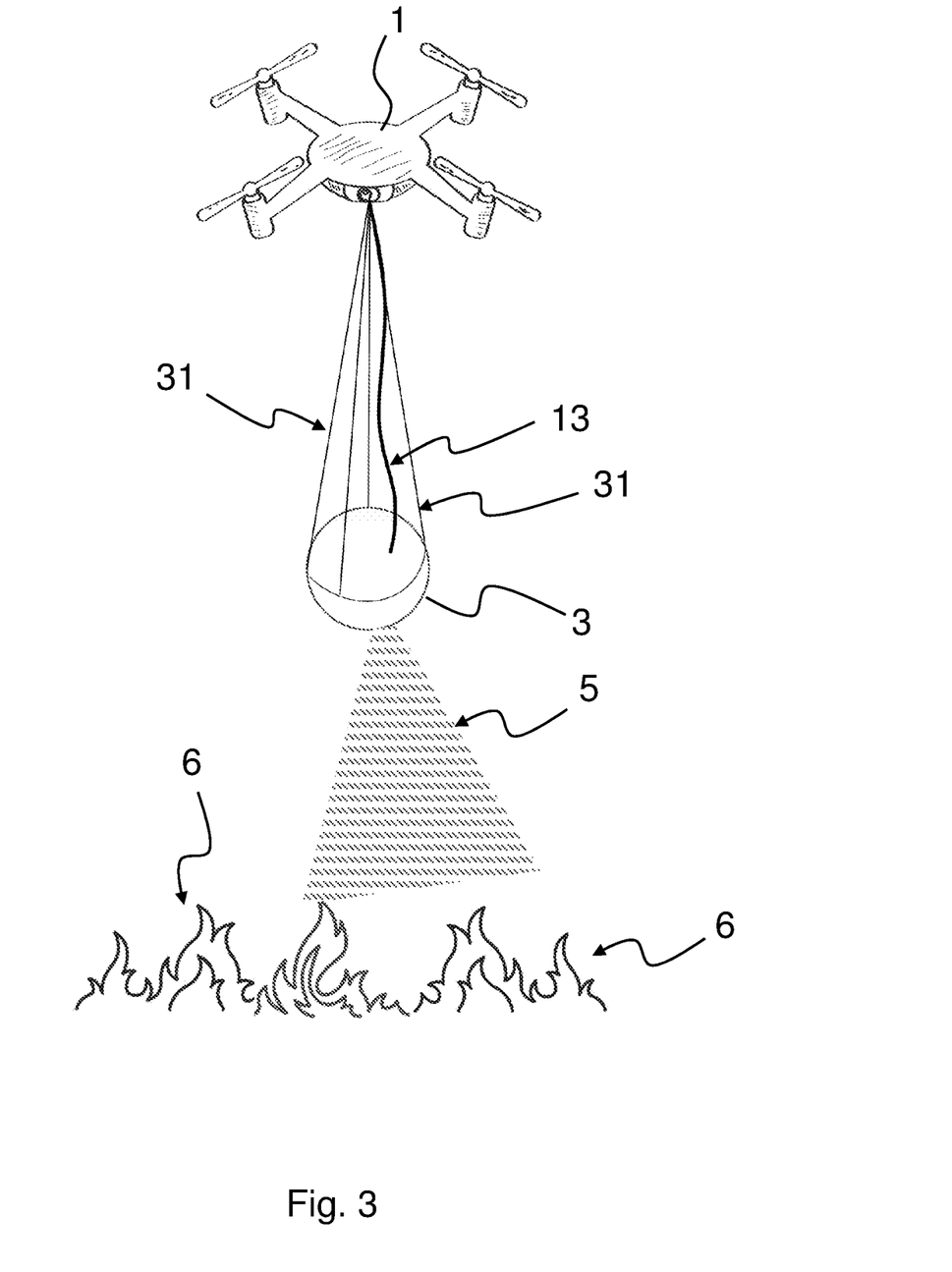
FIG. 3 illustrates a further embodiment of the drone belonging to the system object of the present disclosure.

FIG. 3 illustrates an exemplary diagram, in which the drone 1 releases a service material, for example the extinguishing liquid 5 on the fire 6.

Figure 6A:
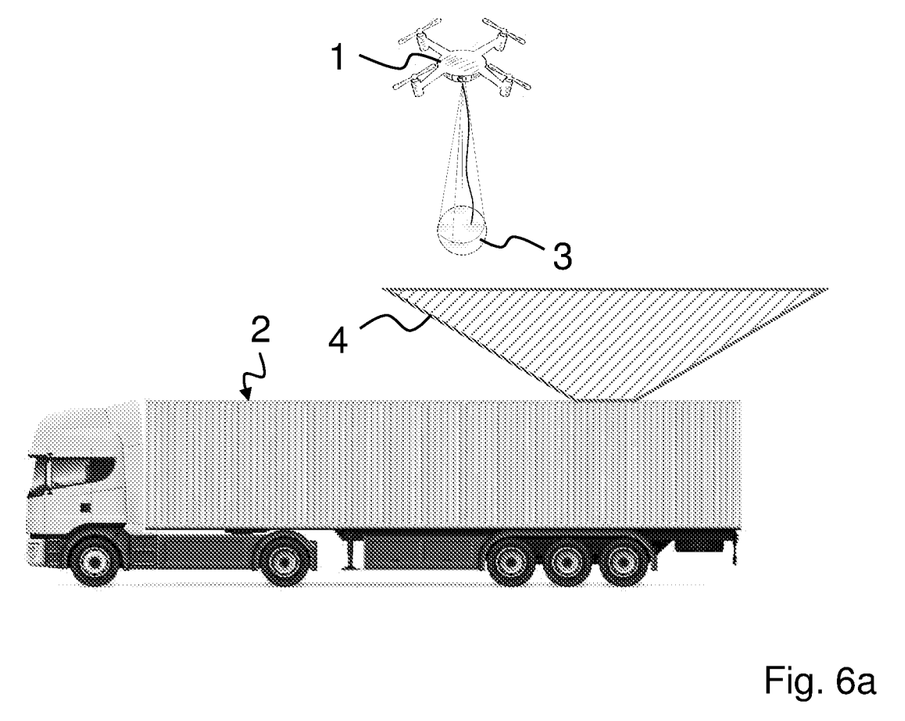
FIGS. 6a to 6f illustrate the various management steps of the drone belonging to the system object of the present disclosure.
Figure 6B:
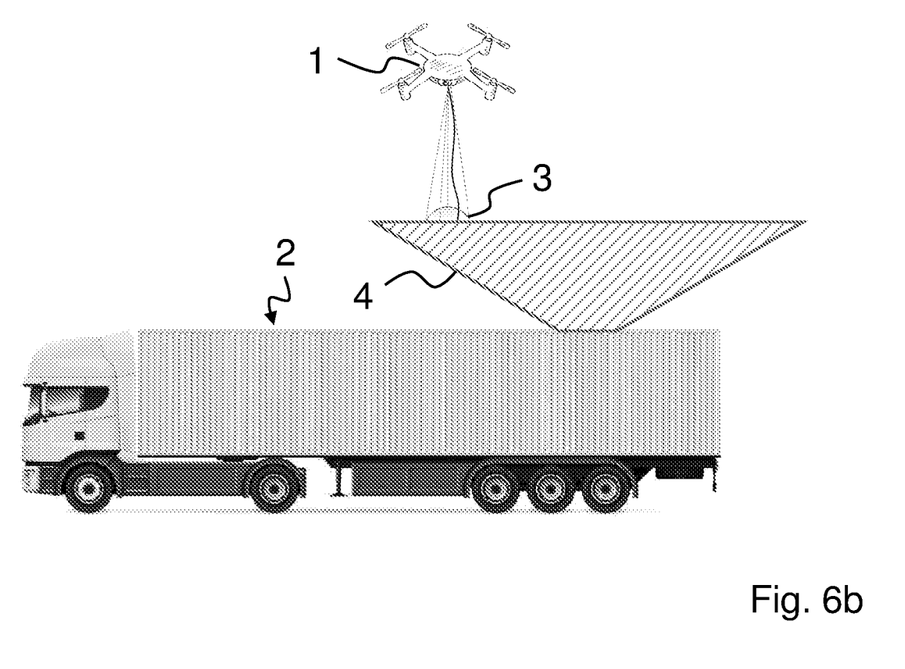
Figure 6C:
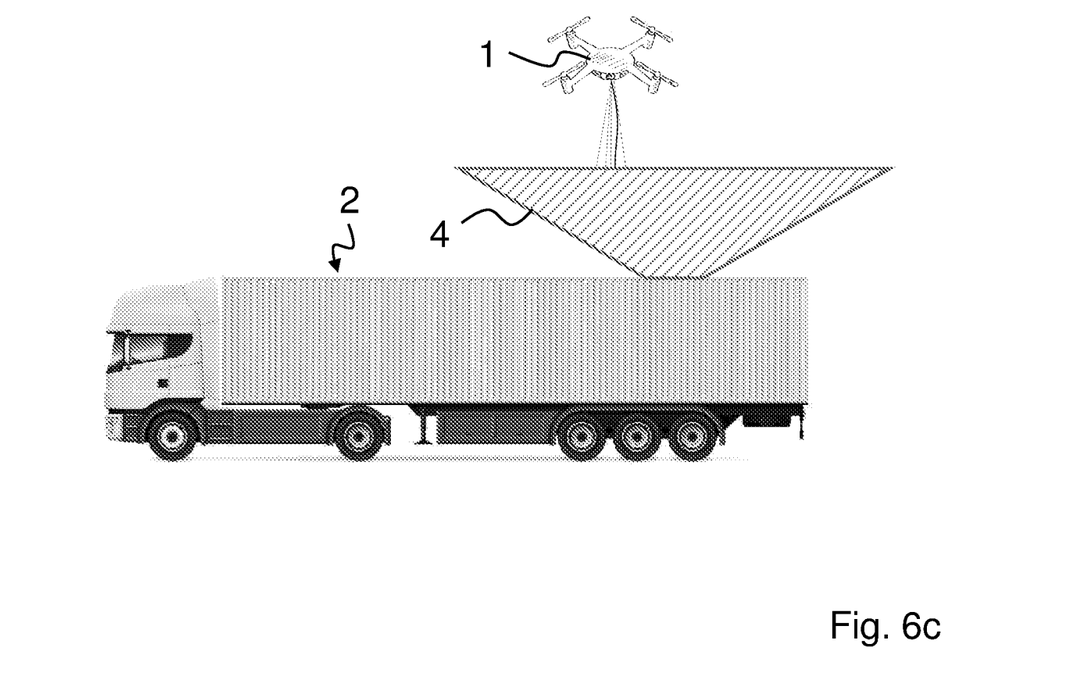
Figure 6D:
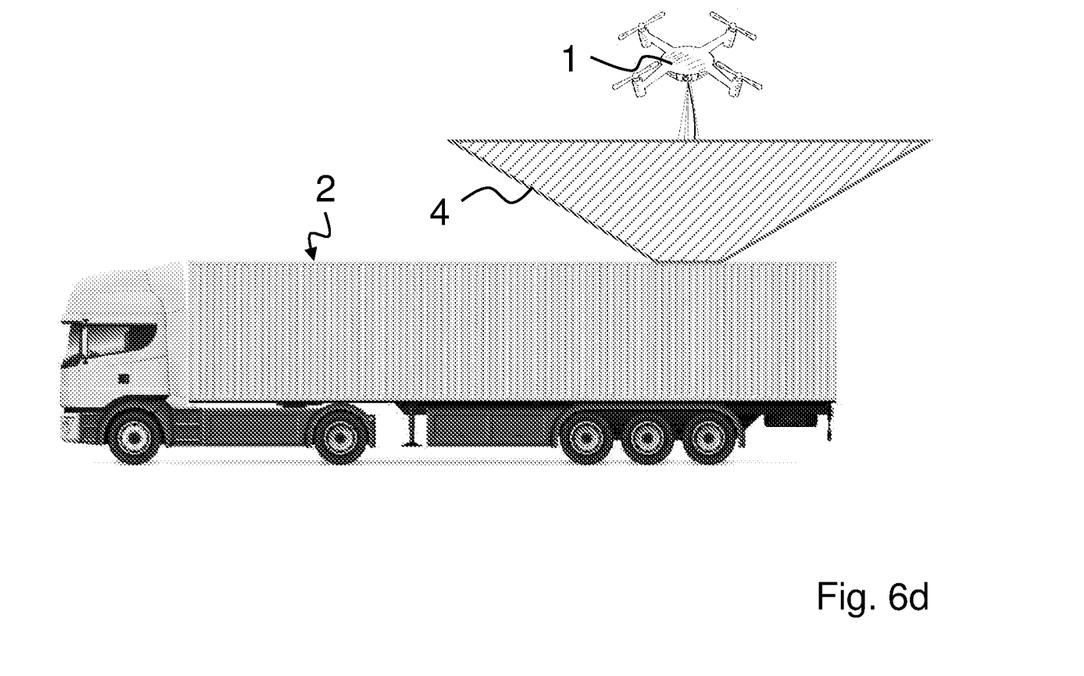
Figure 6E:
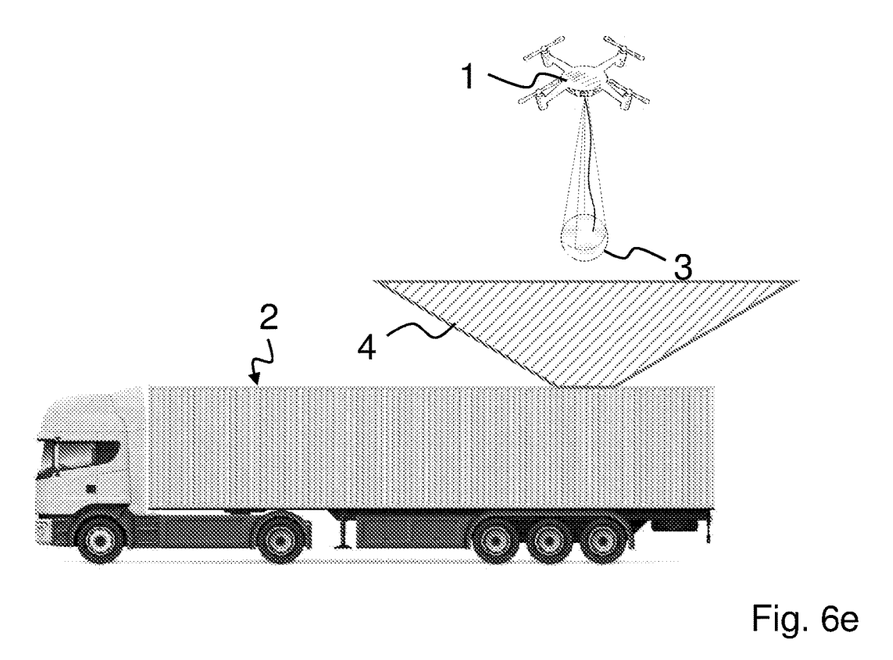
Figure 6F:
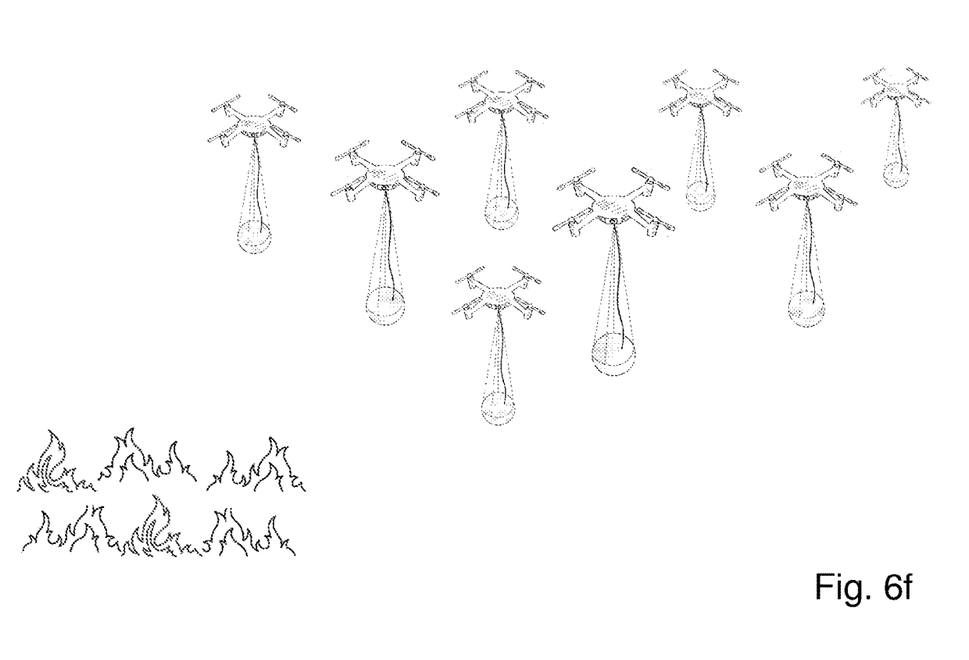

The scenario of FIG. 3 is obviously replicable for fleets of drones 1, as illustrated in FIG. 6f.

With particular reference to FIGS. 1a to 3, the drone 1 envisages that the container 3 is fixed through connection cables 31, which confer an oscillation of the container 3 with respect to the drone 1, in a manner entirely similar to the bucket used by helicopters during firefighting operations.

The container 3 can obviously comprise several separate compartments, optionally each with an inlet mouth thereof so as to transport different liquids or service materials.

Furthermore, the container 3 can have connectors for the electrical connection to and from the logistic support unit 2 and/or to or from the drone 1.

Such connectors can be used for the transfer of information and/or to operate remote commands and automations on the container 3.

The drone 1 can be made according to any manner known in the state of the art, and comprises propulsion propellers powered by an energy source.

Optionally, according to the variant illustrated in the figures, such propulsion propellers are driven by combustion propulsion means, which thus require fuel.

Figure 2:
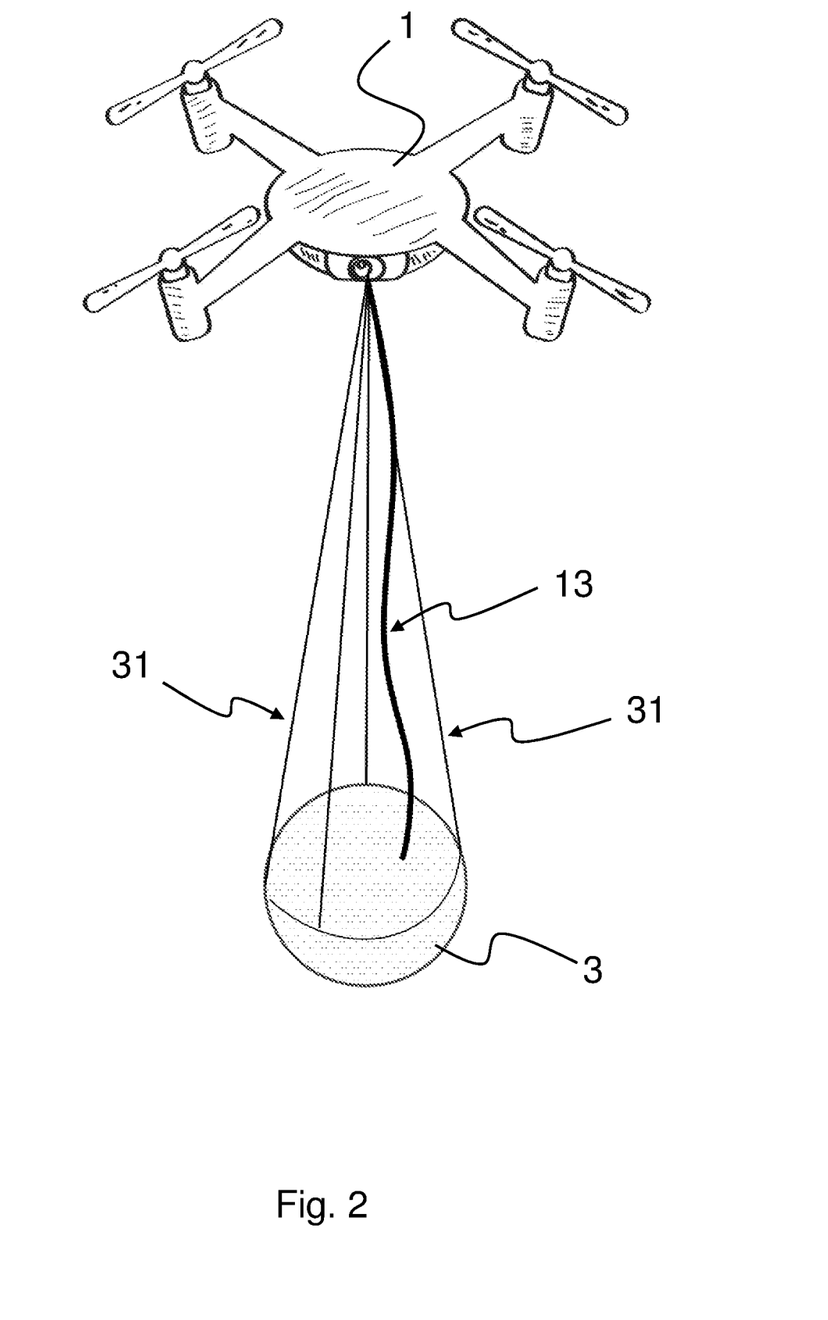
FIG. 2 illustrates a possible embodiment of the drone belonging to the system object of the present disclosure.

The fuel is contained inside the container 3, which has a connecting tube 13, FIGS. 2 and 3, to allow the fuel to reach the propulsion means included inside the drone body 1.

Figures 4A, 4B:
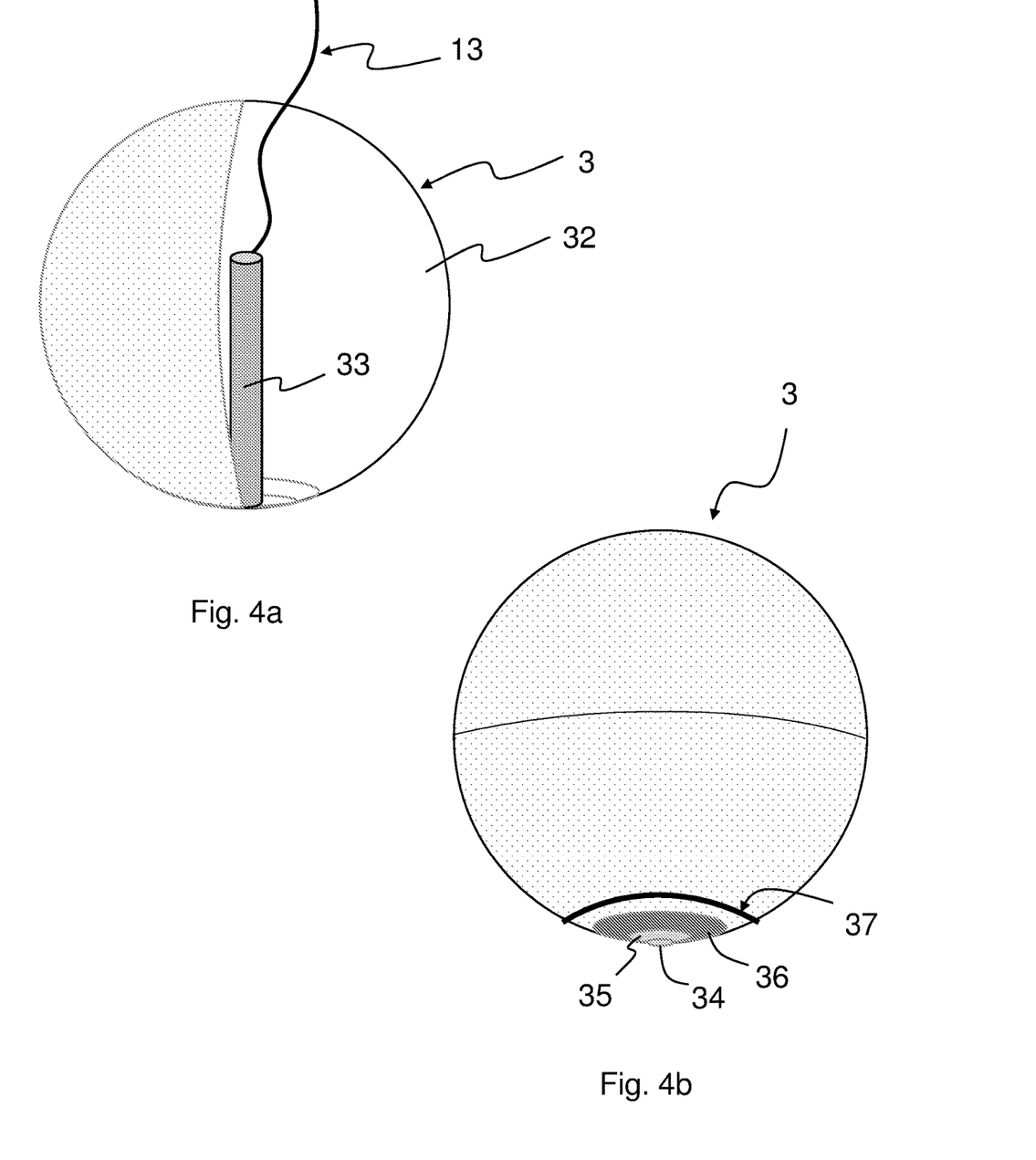
FIGS. 4a to 4c illustrate three views of the container belonging to the system object of the present disclosure.
Figures 4C, 5:
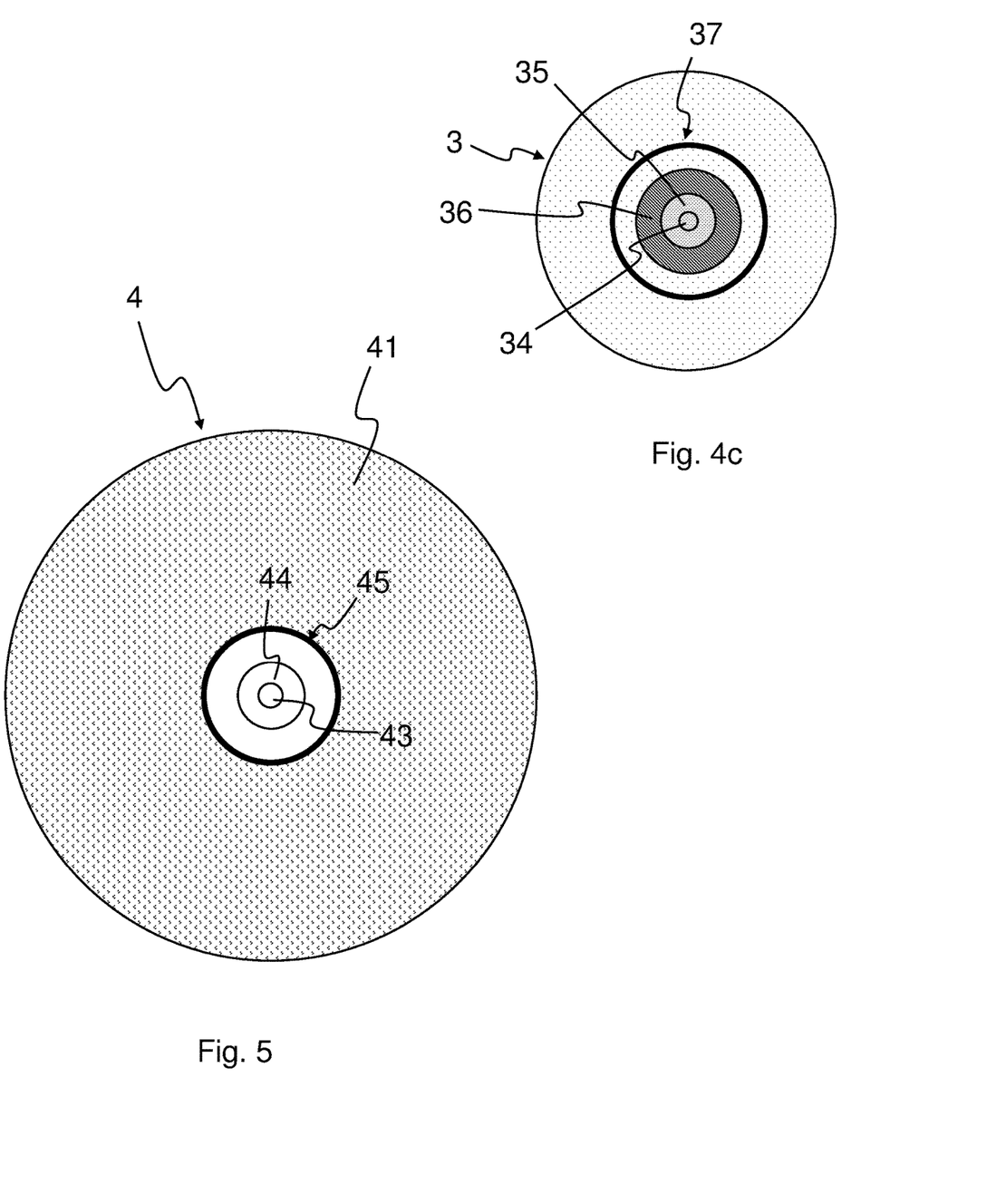
FIG. 5 illustrates a view of a possible embodiment of the basin element belonging to the system object of the present disclosure.

To obtain such a configuration, the container 3, of which a possible embodiment is illustrated in FIGS. 4a to 4c, comprises a first compartment 32 adapted to contain the extinguishing liquid and a second compartment 33 adapted to contain the fuel and in communication with the drone 1 through the tube 13.

Each compartment has an inlet mouth thereof for the resupply of the compartment.

As can be seen in the figures, FIG. 4a illustrates a concept diagram of a section of the container 3, FIG. 4b illustrates a side view of a concept diagram of the container 3, and FIG. 4c illustrates a bottom view of a concept diagram of the container 3.

In particular, FIGS. 4b and 4c, the container 3 has an inlet mouth 34 for the first compartment 32, an inlet mouth 35 for the second compartment 33, a release hatch 36 for the material contained inside the first compartment 32 and mechanical locking means 37, the operation of which will be described later.

By virtue of such a configuration, the container 3, positioned at the resupply means can be filled simultaneously with both fuel in the second compartment 33, and with the extinguishing liquid in the first compartment 32.

It follows that the resupply means included on board the logistic support unit 2 must have a similar configuration, i.e., corresponding to that of the mouths of the container 3.

For this reason, FIG. 5 shows a concept diagram of a top view of the basin element 4, in which the container 3 is placed.

Subsequently, it will be described how the container 3 runs along the walls 41 of the basin element 4 to position itself precisely at the resupply point.

Once the container is correctly positioned inside the basin element 4, the mouth 34 of the first compartment 32 is coupled and in communication with the corresponding mouth 43, while the mouth 35 of the second compartment 33 is coupled and in communication with the corresponding mouth 44.

It is evident that the mouth 43 is connected to a tank containing the material to be inserted inside the first compartment 32, while the mouth 44 is connected to a tank containing the material, optionally fuel, to be inserted inside the second compartment 33.

Advantageously, pumping means are included for filling the first 32 and the second 33 compartments.

It is obviously possible to envisage that the logistic support unit rests on auxiliary units suitable for the transport of tanks, such as tankers, which are connected to the mouths 34 and 44 present on the logistic support unit.

It is possible to envisage that the mouths 43 and 44 are integrated into the centre of the basin element 4, or that the basin element 4 has a central hole capable of housing and connecting the mouths of the container 3 with the mouths 43 and 44.

In this second case, the mouths 43 and 44 are included inside the logistic support unit 2.

As illustrated in FIGS. 4 c and 5, the container 3 and the basin element 4 include locking means for fixing the container 3 in position.

In particular, it is possible to include first locking means which cooperate with corresponding second locking means 45.

The locking means can consist of a device for centring and orienting the container 3 with respect to the basin element 4 and by an electromagnetic opening/closing system for maintaining the connection between the logistic support unit 2 and the container 3 during the entire resupply step.

As anticipated, the presence of the basin element 4 facilitates the positioning of the container 3 for the resupply, as the container 3 slides along the walls 41 of the basin element 4 to reach the central point of the basin element 4 where the resupply occurs.

For this reason, the basin element 4 can be made in any of the manners known in the state of the art, as long as it has the walls 41 converging towards the resupply point.

The basin element 4 can for example include four side walls, joined in pairs through a junction element.

Therefore, all the side walls make a slide, in connection with the resupply point.

Optionally, the side walls have hinges at the base, so as to be able to oscillate, to close in the direction of the resupply point and decrease the dimensions of the logistic support unit 2.

It is evident that the side walls, in the closed condition, overlap at the roof of the truck.

Any joining elements withdraw in the closed condition of the side walls, so that they either fit between one wall and the other, or fall inside the thickness of the side walls or, alternatively, are made of a sufficiently yieldable material, so as to bend.

Regardless of the embodiment of the basin element 4, the container 3 slides along the walls 41 of such a basin element: the container 3 in the figures is illustrated is spherical in shape, however it is possible to envisage any shape.

For this reason, to facilitate the sliding of the container 3 on the walls 41, it is possible to envisage a system to facilitate the translation of the container 3 to the centre of the basin element 4 during its descent, such as metal beads arranged along the walls, which facilitate the descending direction and the sliding of the container 3.

The beads can be moved passively, i.e., by virtue of the sliding of the container on their surfaces, or they can be of an automated type.

FIGS. 6 a to 6 f illustrate a concept diagram of a possible operation of the system object of the present disclosure.

The figures show the case of only one drone, but it is clear how the steps illustrated can be repeated for fleets of drones, especially in firefighting missions, as illustrated in FIG. 6 f.

When there is a need to carry out a specific mission, one or more logistic support units 2 are transported to near where the mission is to be carried out.

The logistic support units 2 deploy the drones transported therein, if any, and allow the take-off/landing of such drones. The drones can also be already present or transported by other means and can also land in different areas with respect to the logistic supports unit 2.

The drones begin to carry out the pre-arranged mission by performing shuttling for the transport of the service material between the logistic support unit 2 and the place where it is to be released.

Once the first transport has been carried out, the drones return to the logistic support unit 2 and ensure that the container 3 transported thereby can be reloaded.

Optionally, the descent of the container 3 towards the resupply point is always managed by the drone, which adjusts the flight altitude, detecting the distance with respect to the basin element 4.

The same container 3 can integrate dedicated sensors to detect the contact and the descending direction so as to inform the drone 1 of the lateral movement it must make to reach vertically above the centre of the basin element 4.

The drone 1, FIG. 6 a, arrives at the basin element 4 and begins its descent so that the container 3 can enter inside the basin element 4, FIG. 6 b.

Decreasing the height, the descent of the container 3 inside the funnel sees to the automatic centring and possible orientation, FIG. 6 c.

Once the centre of the basin element has been reached, FIG. 6 d, the container 3 is connected to the dispensers integrally by virtue of the locking/unlocking system 45 and 37 to ensure integral contact during the resupply step.

The resupply system is then activated which dispenses the liquids from the logistic support unit 2 to the container 3 up to an established filling.

The locking system is released by releasing the container 3, so that the drone 1 can again rise with respect to the logistic support unit 2, FIG. 6 *e*.

With the container 3 full, the drone 1 can transport and release the contained extinguishing material, so as to subdue the fire, as illustrated in FIG. 6 *f*, and then endlessly repeat the cycle 24 hours a day.

It is evident, from what has been described, that the filling automations of the container 3 can be controlled by a central control unit, remote or on board the logistic support unit 2, which monitors and controls the entire procedure.

Such a central control unit can also control the opening/closing of the side walls, as well as supervise the guidance of the drones 1.

It is also evident that a user can manually intervene, through remote controls, on the movement of the drones and on the procedure described.

While the disclosure is susceptible to various modifications and alternative constructions, some example embodiments have been shown in the drawings and described in detail.

It should be understood, however, that there is no intention of limiting the disclosure to the specific illustrated embodiment but, on the contrary, it aims to cover all the modifications, alternative constructions, and equivalents falling within the scope of the disclosure as defined in the claims.

The use of "for example", "etc.", "or" refers to non-exclusive non-limiting alternatives, unless otherwise stated.

The use of "includes" means "includes but not limited to", unless otherwise stated.

The invention claimed is:

1. A drone management system, comprising:
   a drone and a logistic support unit of the drone,
   the drone comprising a container configured to contain a service material, the container comprising at least one inlet mouth for receiving the service material and expulsion unit configured to dispense the service material,
   the logistic support unit comprising a resupply area configured to receive the container and a resupply unit within the resupply area,
   the resupply unit comprising a position locking unit to lock the container in position, and a dispensing unit configured to supply the service material to the container of the drone,
   the resupply area comprising a basin element having walls that converge toward a central resupply point,
   the basin element being configured to facilitate positioning of the container for resupply, such that the container slides along the walls of the basin element to reach the central resupply point, translation of the container towards a center of the basin element and the central resupply point during descent being facilitated by sliding elements, the sliding elements comprising metal beads arranged along the walls that guide the container in a descending direction and enable sliding motion, and
   the metals beads being passively actuated by movement of the container along their surfaces.

2. The system according to claim 1, wherein the drone comprises a distance detection unit configured to detect a distance between the drone and the resupply area.

3. The system according to claim 2, wherein the position locking unit comprises an orientation unit configured to orient the container with respect to the resupply unit.

4. The system according to claim 1, wherein the position locking unit comprises an orientation unit configured to orient the container with respect to the resupply unit.

5. The system according to claim 1, wherein the container is fixed to the drone via one or more connection cables.

6. The system according to claim 1, wherein the container comprises an electrical connection unit configured to connect to at least one of the drone and the logistic support unit.

7. The system according to claim 1, wherein:
   the drone comprises a combustion propulsion unit,
   the container comprises a first compartment and a second compartment isolated from each other, and
   the first compartment being configured to contain the service material and the second compartment being configured to contain fuel for the combustion propulsion unit, the second compartment being in fluid communication with the drone.

8. The system according to claim 7, wherein the dispensing unit is in fluid communication with:
   a service material tank configured to supply the first compartment; and
   a fuel tank configured to supply the second compartment,
   wherein the dispensing unit comprises a first dispensing mouth configured to connect with the first compartment and a second dispensing mouth configured to connect with the second compartment.

9. The system according to claim 7, wherein the combustion propulsion unit is mounted to the drone and the container is mounted below a body of the drone.

10. The system according to claim 1, wherein the position locking unit comprises an electromagnetic unit configured to engage with the container to maintain positioning during resupply.

* * * * *